(12) United States Patent
Su et al.

(10) Patent No.: US 8,798,184 B2
(45) Date of Patent: Aug. 5, 2014

(54) TRANSMIT BEAMFORMING WITH SINGULAR VALUE DECOMPOSITION AND PRE-MINIMUM MEAN SQUARE ERROR

(75) Inventors: Chi-Lin Su, Zhubei (TW); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 13/457,395

(22) Filed: Apr. 26, 2012

(65) Prior Publication Data

US 2013/0287069 A1 Oct. 31, 2013

(51) Int. Cl.
*H04B 7/02* (2006.01)
*H04K 1/10* (2006.01)

(52) U.S. Cl.
USPC .......................................... 375/267; 375/260

(58) Field of Classification Search
USPC .......................................... 375/267, 260, 259
See application file for complete search history.

(56) References Cited

U.S. PATENT DOCUMENTS

2012/0014415 A1* 1/2012 Su et al. ........................ 375/140
2012/0185248 A1* 7/2012 Sehlstedt ...................... 704/233

OTHER PUBLICATIONS

Dang U.L., et al., "MMSE Beamforming for SC-FDMA Transmission over MIMO ISI Channels with Linear Equalization", GLOBECOM 2010, 2010 IEEE Global Telecommunications Conference, IEEE, Piscataway, N J, USA, Dec. 6, 2010, pp. 1-6, ISBN: 978-1-4244-5636-9.*
Dang U.L., et al., "MMSE Beamforming for SC-FDMA Transmission over MIMO ISI Channels with Linear Equalization", GLOBECOM 2010, 2010 IEEE Global Telecommunications Conference, IEEE, Piscataway, NJ, USA, Dec. 6, 2010, pp. 1-6, ISBN: 978-1-4244-5636-9.
International Search Report and Written Opinion—PCT/US2013/037253—ISA/EPO—Jul. 30, 2013.
Sampath H., et al., "Generalized Linear Precoder and Decoder Design for MIMO Channels Using the Weighted MMSE Criterion", IEEE Transactions on Communications, IEEE Service Center, Piscataway, NJ, USA, vol. 49, No. 12, Dec. 1, 2001, pp. 2198-2206, ISSN: 0090-6778.
Psaltopoulos et al.: "Generalized MMSE Detection Techniques for Multipoint-To-Point Systems", Institute for Circuit Theory and Signal Processing, Munich University of Technology, 80290 Munich, Germany, IEEE GLOBECOM 2006 Proceedings, 5 pgs.

* cited by examiner

*Primary Examiner* — Chieh M Fan
*Assistant Examiner* — Brian J Stevens
(74) *Attorney, Agent, or Firm* — Holland & Hart LLP

(57) ABSTRACT

Transmitting beamforming can steer a transmitting signal to reduce the interference between spaces of a MIMO system and achieves constructive combination at the receiver. One method of steering matrix calculation includes using singular value decomposition (SVD). Notably, the singular values of SVD, which represent the stream strengths in a MIMO system, are in descending order. In equal modulation, signal strength degradation makes the receive EVM of the latest stream poor and increases the probability of packet error. MMSE can be used to weight the steering vectors of the steering matrix calculated in SVD. This weighting of the singular values can balance the SNR of the streams, thereby improving packet error rate.

20 Claims, 5 Drawing Sheets

US 8,798,184 B2

TRANSMIT BEAMFORMING WITH SINGULAR VALUE DECOMPOSITION AND PRE-MINIMUM MEAN SQUARE ERROR

BACKGROUND OF THE INVENTION

1. Field of the Invention

The present invention relates to a multiple-input multiple-output (MIMO) communication system, and in particular to MIMO transmit beamforming using singular value decomposition and pre-minimum mean square error.

2. Related Art

In a radio frequency communication system, the use of multiple antennas can increase data throughput without additional bandwidth or increased transmit power. In one antenna configuration called multiple-input multiple-output (MIMO), multiple antennas are used at both the transmitter and receiver. Specifically, a transmitter sends multiple streams by multiple antennas through a matrix channel to a receiver, which receives those multiple streams using its antennas. The matrix channel consists of all paths between transmit and receive antennas.

Beamforming, which changes the directionality of the antennas (transmit and/or receive antennas), can be used to achieve spatial selectivity and thereby improve the performance of a MIMO system. For transmit beamforming, one or more steering matrices can be applied to the data to be transmitted to ensure that signals transmitted from the transmit antennas arrive constructively at each specified receive antenna and destructively at receive antennas other than the specified receive antenna. These steering matrices can control the phase and amplitude of the signal transmitted by each antenna.

SUMMARY OF THE INVENTION

A method to improve packet error rate in a multiple-input multiple-output (MIMO) communication system is described. This method includes decompressing, at a transceiver (including a transmitter and a receiver), a plurality of stored beamforming steering matrices. The stored beamforming steering matrices are associated with a plurality of sub-carriers of a radio frequency (RF) signal received by the transceiver. Singular values can be decomposed by singular value decomposition (SVD). A predicted signal to noise ratio (SNR) can be computed based on those singular values. In one embodiment, computing the predicted SNR can include computing averaged singular values. A maximum number of streams used by the MIMO communication system can be determined based on the singular values. Minimum mean square error (MMSE) and the predicted SNR can be used to weight steering vectors of the stored beamforming steering matrices for the streams. The weighted steering vectors can be applied to data to be transmitted by the transceiver to generate beamformed data streams.

A transceiver in a MIMO system is also described. This transceiver includes a steering matrix retrieval block configured to decompress a plurality of stored beamforming steering matrices. This steering matrix retrieval block can include a pre-minimum mean square error (pre-MMSE) block configured to determine a maximum number of data streams based on a predicted signal to noise ratio (SNR) and to weight steering vectors of the stored beamforming steering matrices using the predicted SNR and the maximum number of data streams. The transceiver can further include a coding block, a plurality of multipliers, and a baseband processing block. The coding block can be configured to receive data to be transmitted and to split the data into a plurality of data streams corresponding to the plurality of sub-carriers, wherein the maximum number of data streams is equal to or less than the plurality of data streams. Each multiplier can receive inputs from the pre-MMSE block and one of the plurality of data streams. The baseband processing block can be configured to convert beam-formed outputs from the plurality of multipliers from a frequency domain into a time domain and generate a plurality of transmit signals.

The steering matrix retrieval block can further include a phase smoothing block, an interpolating/ungrouping block, a phase offset block, and a smoothing block. The phase smoothing block can be configured to provide phase continuity by rotating one or more steering vectors by a predetermined phase difference. The interpolating/ungrouping block can be configured to interpolate the decompressed steering matrices to obtain beamforming steering matrices associated with all sub-carriers. In one embodiment, the interpolating/ungrouping block can include a smoothing filter to minimize the effects of noise on the stored beamforming steering matrices. The phase offset block can be configured to compensate for a phase difference caused by cyclic shift definition (CSD) in dynamic bandwidth steering. The smoothing block can be configured to provide continuity of the stored beamforming steering matrices in a frequency domain.

Another transceiver in a MIMO system is described. This transceiver includes means for decompressing, at the transceiver, a plurality of stored beamforming steering matrices, means for determining a maximum number of streams used by the MIMO communication system (the maximum number based on singular values), means for using minimum mean square error (MMSE) and a predicted SNR to weight steering vectors of the plurality of stored beamforming steering matrices for the streams, and means for applying the weighted steering vectors to data to be transmitted by the transceiver to generate beamformed data streams.

Yet another transceiver in a MIMO communication system is described. This transceiver includes means for decompressing a plurality of stored beamforming steering matrices, means for using a pre-minimum mean square error (pre-MMSE) equation and a predicted signal to noise ratio (SNR) to weight the stored beamforming steering matrices, means for splitting data to be transmitted into a plurality of data streams corresponding to a plurality of sub-carriers, means for multiplying outputs from the means for decompressing and the means for splitting to generate beam-formed signals, and means for converting the beam-formed signals from a frequency domain into a time domain, thereby generating a plurality of transmit signals.

A non-transitory, computer-readable medium storing instructions for improving a packet error rate in a MIMO communication system is also described. These instructions, when executed by a processor of a transceiver, perform steps including decompressing a plurality of stored beamforming steering matrices, computing a predicted signal to noise ratio (SNR) based on the singular values, determining a maximum number of streams used by the MIMO communication system based on the singular values, using minimum mean square error (MMSE) and the predicted SNR to weight steering vectors of the streams, and applying the weighted steering vectors to data to be transmitted by the transceiver to generate beamformed data streams.

DETAILED DESCRIPTION OF THE DRAWINGS

Figure 1:
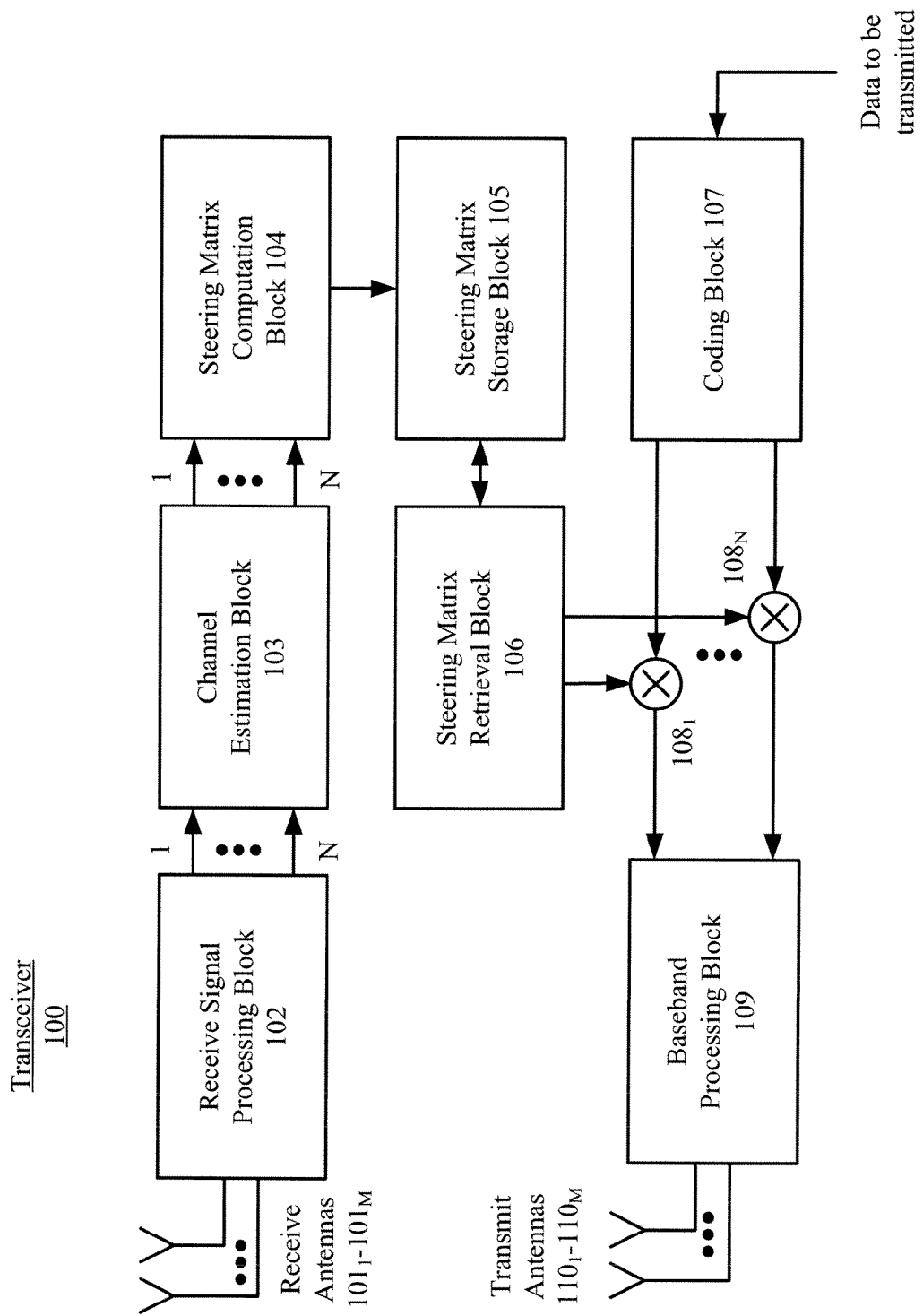
FIG. 1 illustrates an exemplary transceiver configured to provide singular value decomposition (SVD) and pre-minimum mean square error (pre-MMSE).

FIG. 1 illustrates an exemplary transceiver 100 (which can perform both receive and transmit functions, i.e. includes a receiver and a transmitter) configured to determine and apply steering matrices for beamforming. In this embodiment, transceiver 100 includes M receive chains and M transmit chains (M being an integer greater than one). Receive antennas $101_1$-$101_M$, which receive radio frequency (RF) signals, e.g. a null data packet (NDP) sounding packet, are coupled to a receive signal processing block 102. Receive signal processing block 102 can detect packets, amplify the RF signals as necessary, filter the RF signals, perform analog to digital conversion (ADC) on the filtered signals, and convert the digitized signals from a time domain to a frequency domain (using Fast Fourier Transforms).

Receive signal processing unit 102 generates N processed signals, wherein N is the number of used OFDM sub-carriers and each of the N processed signals corresponds to a specific OFDM sub-carrier. Channel estimation block 103, which is coupled to receive signal processing block 102, can receive these N processed signals. Channel estimation block 103 can use training symbols in the received symbols to determine N estimated channel matrices that correspond to the N OFDM sub-carriers.

A steering matrix computation block 104, which is coupled to channel estimation block 103, can generate one or more steering matrices for each of the N OFDM sub-carriers. Thus, for the N OFDM sub-carriers there are at least N steering matrices. Note that the number of rows and columns in each of the N steering matrices depends on the number of space-time streams. In one embodiment, steering matrix computation block 104 can also group and compress the steering matrices to minimize the memory needed to store this information. U.S. Publication 2012/0014415, entitled, "Transmitter Beamforming Steering Matrix Processing And Storage", published on Jan. 19, 2012, and incorporated by reference herein, describes exemplary compression techniques. In one embodiment, compressing can be performed using Givens rotation. A steering matrix storage block 105, which is coupled to steering matrix computation block 104, can store the steering matrices.

For transmit beamforming, this stored information can be accessed and used. Specifically, a steering matrix retrieval block 106, which is coupled to steering matrix storage block 105, can access the stored matrices (providing decompression, weighting by predicted SNR and ungrouping as necessary) and provide them as inputs to multipliers $108_1$-$108_N$.

A coding block 107 receives data to be transmitted and splits the data into N data streams corresponding to the N OFDM sub-carriers. Coding block 107 and steering matrix retrieval block 106 are coupled to multipliers $108_1$-$108_N$. Using inputs from coding block 107 and steering matrix retrieval block 106, multipliers $108_1$-$108_N$ generate beamformed outputs. Baseband processing block 109, which is coupled to multipliers $108_1$-$108_N$, can convert the N beamformed outputs from a frequency domain into a time domain (using for example inverse FFTs), provide appropriate modulation and amplification, and generate M transmit signals. Transmit antennas $110_1$-$110_M$, which are coupled to baseband processing block 109, can transmit the processed signals. In one embodiment, receive signal processing block 102, channel estimation block 103, and steering matrix computation block 104 can be characterized as part of a receiver of transceiver 100, whereas steering matrix storage block 105, steering matrix retrieval block 106, coding block 107, mixers $108_{1-N}$, and baseband processing block 109 can be characterized as part of a transmitter of transceiver 100. The values in steering matrix storage block 105 are also referred to as feedback herein because the receiver feeds back information for transmit beamforming to the transmitter.

Figure 2:
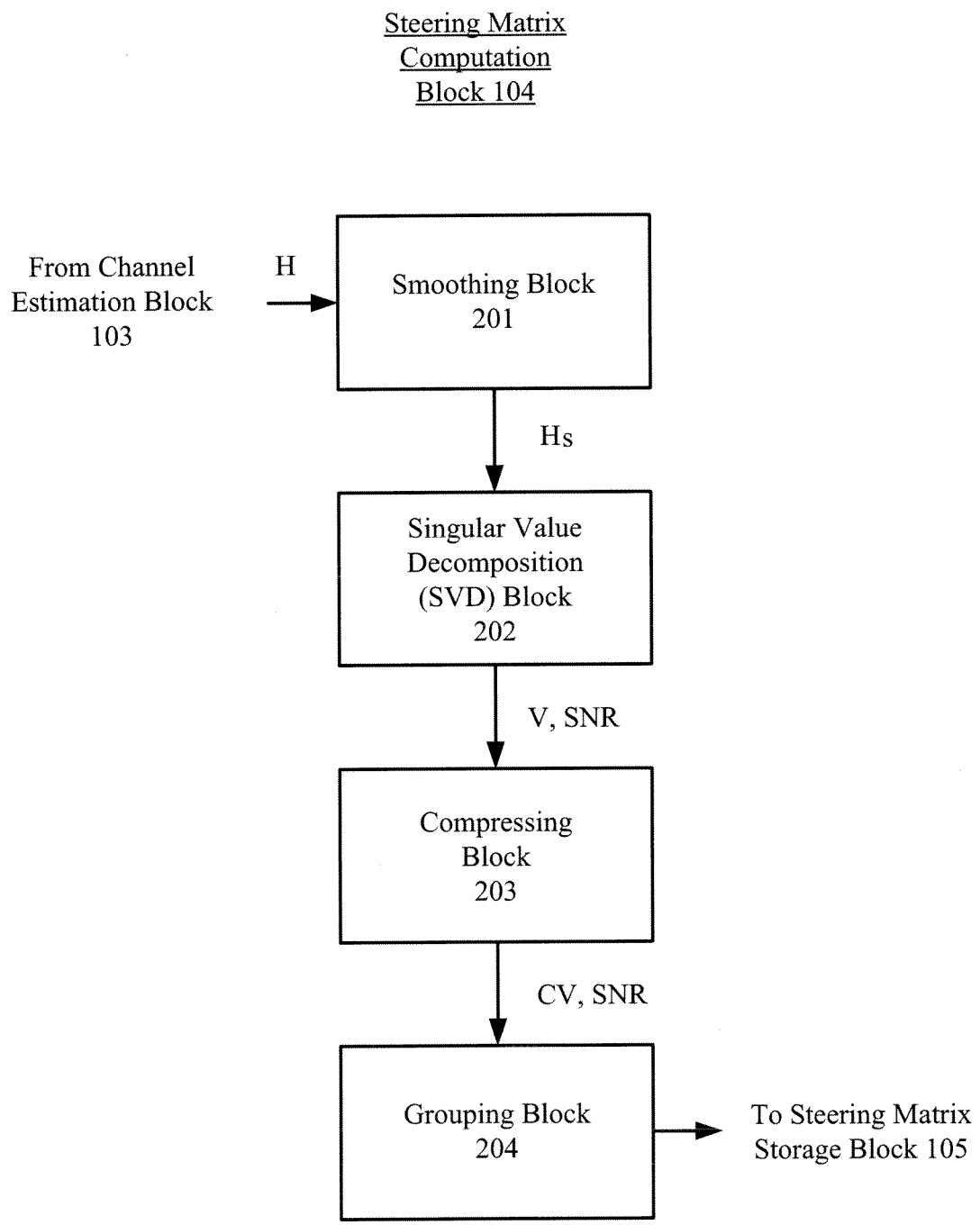
FIG. 2 illustrates an exemplary steering matrix computation block.

FIG. 2 illustrates an exemplary steering matrix computation block 104. In this embodiment, steering matrix computation block 104 includes a smoothing block 201, singular value decomposition (SVD) block 202, a compressing block 203, and a grouping block 204. Smoothing block 201 receives channel estimates (H) from the channel estimation block 103 (FIG. 1) and generates a channel matrix for each OFDM sub-carrier (wherein each OFDM sub-carrier is associated with a distinct steering matrix). Smoothing block 201 can be implemented with a filter that can minimize the effects of noise on the channel estimates. Exemplary filters include, for example, a moving average filter or any suitable low pass filter. Smoothing block 201 outputs smoothed channel estimates $H_S$.

Singular value decomposition (SVD) block 202 can decompose the smoothed channel estimates $H_S$ to generate a plurality of steering matrices V, one steering matrix corresponding to each OFDM sub-carrier. SVD block 202 can decompose each steering matrix into left and right orthonormal matrices and a diagonal matrix (both described in further detail below). Notably, this diagonal matrix consists of singular values S in descending order. An equivalent channel modulation with SVD steering matrix can provide the best SNR on the first stream and the worst SNR on the last stream. An unequal channel modulation can advantageously provide a proper modulation type for different SNRs in transmit beamforming. Note that without unequal modulation, the stream with the lowest SNR will dominate the packet error rates. SVD block 202 can also generate a predicted signal-to-noise ratio (SNR) of the sub-carriers by averaging the singular values S. The predicted SNR of each stream will be calculated by averaging the singular values over valid subcarriers.

Compressing block 203 compresses the steering matrices V associated with the OFDM sub-carriers. In one embodiment, a Givens rotation can be used to provide the compression. In one embodiment, grouping block 204 receives the predicted SNR and the compressed steering matrices CV, but retains only a pre-defined number of steering matrices to reduce the memory needed for storage or feedback overhead. The number of retained steering matrices may be determined based on the compression factor, available storage, permissible overhead, sub-carrier error rate, etc. In one preferred embodiment, the SNR as well as the sub-carriers (as defined in the applicable standard, e.g. 802.11n, 802.11ac, etc.) associated with the retained steering matrices and the grouping information (Ng=0, 1, 2, etc.) can also be sent as feedback. Thus, steering matrix storage block 105 (FIG. 1) can store the grouped and compressed steering matrices, the predicted SNR, and the defined sub-carriers.

Figure 3:
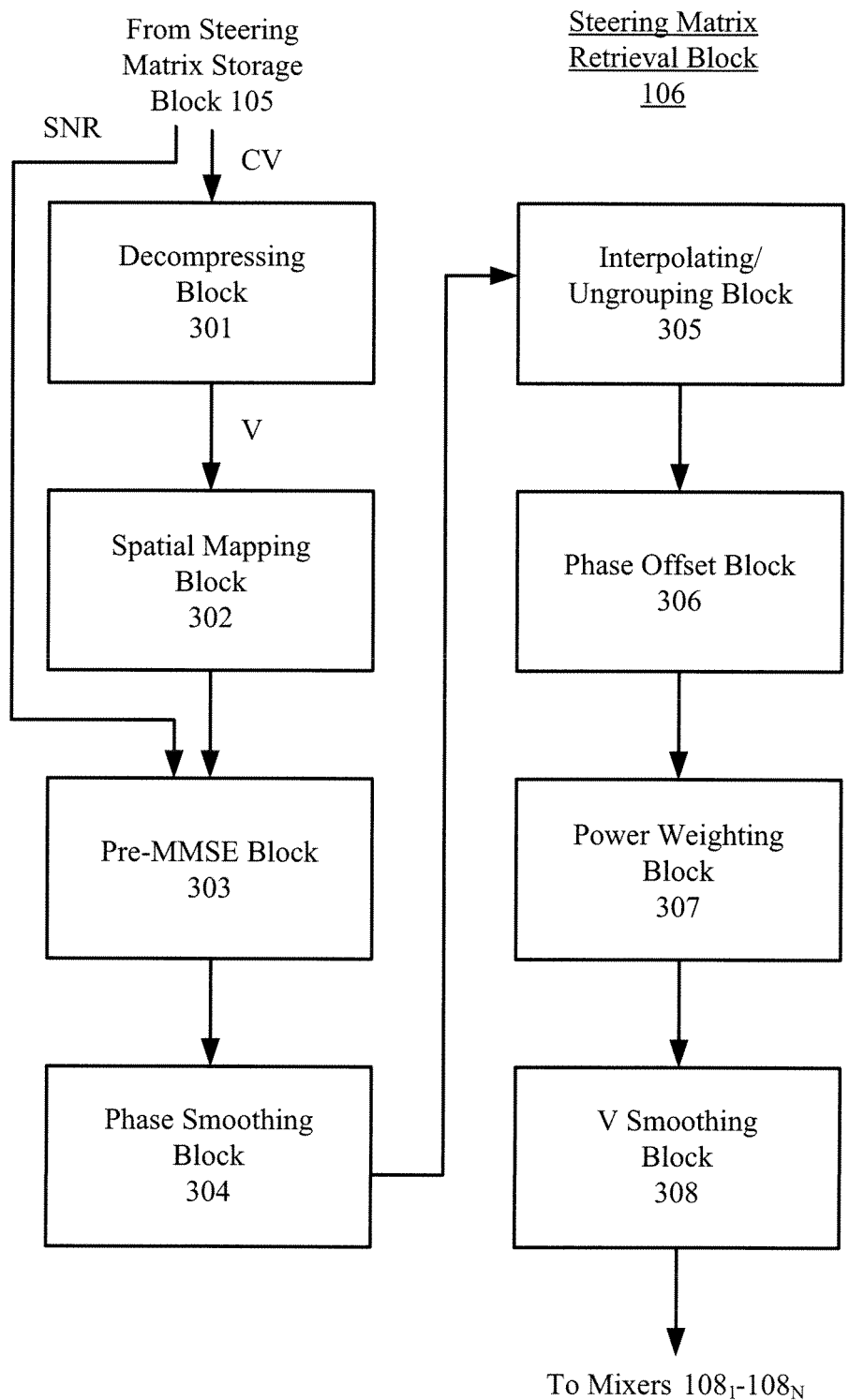
FIG. 3 illustrates an exemplary matrix retrieval block.

FIG. 3 illustrates an exemplary steering matrix retrieval block 106. In this embodiment, steering matrix retrieval block 106 includes a decompressing block 301, which decompresses the compressed steering matrices CV associated with each OFDM sub-carrier. In one embodiment, decompressing block 301 may implement functionality to regenerate the steering matrices from the Givens angles. A spatial mapping block 302 can apply a spatial mapping matrix on the decompressed steering matrices V to make equivalent channels as well as an explicit sounding channel.

A pre-minimum mean square error (pre-MMSE) block 303 can use a weighting method to balance the strength of the streams, i.e. to steer maximum streams equally to the number of transmitting antennas. In one embodiment in which the receiver (of transceiver 100) does not support a maximum likelihood (ML) decoder, pre-MMSE block 303 can also determine a rate for which the number of data streams equals the number of transmitting chains. Moreover, the predicted SNR (provided by steering matrix storage block 105 and accessed by pre-MMSE block 303) can be used to weight the vectors of the stored beamforming steering matrices.

Because the steering matrices generated by SVD block 202 are not unique, the phase across the decompressed steering matrices may not be continuous in the frequency domain. Phase continuity across the steering vectors of consecutive steering matrices can ensure better performance at a receiver. In one embodiment, a phase smoothing block 304 can ensure phase continuity by rotating one or more steering vectors by a predetermined phase difference. Operations of phase difference estimation and phase rotation can be performed for each set of consecutive steering matrices associated with all the sub-carriers.

An interpolating/ungrouping block 305 can interpolate the decompressed steering matrices to obtain steering matrices associated with all sub-carriers. As noted above, grouping block 204 (FIG. 2) may indicate that only a subset of the steering matrices should be stored. Steering matrix interpolating/ungrouping block 305 can use any interpolation technique (e.g. linear interpolation, spline interpolation, etc.) to retrieve the steering matrices that were discarded during the grouping process. For example, the steering matrix interpolating/ungrouping block 305 may determine the Givens angles associated with the discarded steering matrices from the Givens angles associated with the stored steering matrices. In one embodiment, interpolating/ungroup block 305 can also include a smoothing filter to minimize the effects of noise on the steering matrices.

Phase offset block 306 can compensate for the phase difference caused by CSD (cyclic shift definition, see e.g. IEEE 802.11n standard, FIG. 20.2) in dynamic bandwidth steering. In one embodiment, the bandwidth of the CV report may be different from that of the steered packet. Specifically, to reduce the sounding and feedback overhead, a wider bandwidth CV report can be used for steering a narrower bandwidth packet. For example, when a 80 MHz bandwidth CV report is received, partial sub-carriers of this 80 MHz bandwidth CV can be used to steer a 20 or 40 MHz bandwidth packet. Alternatively, a 20 MHz bandwidth packet can be steered with a 40 MHz CV report. Note that a phase offset is needed to correctly select the corresponding sub-carriers and interpolate any lacked tones. Moreover, a phase offset is required to correct the CSD phase difference on different transmitting chains. The phase offset can be computed using $$\Delta\theta = \exp(j2\pi \cdot csd \cdot (\Delta f))$$

where $\Delta f$ is the center frequency difference between steering and sounding.

Note that while the steering matrix is applied, the power of the transmitting antenna may be changed. In that case, to meet IEEE (EVM and spectrum mask) and regulatory requirements, power weighting block 307 can introduce a power factor to limit the in-band power transmitted on each Tx (transmit) chain. A first embodiment of power weighting block 307 can apply a different scale on each chain to transmit the maximum power. A second embodiment of power weighting block 307 can apply the same scale on all chains to keep the beamforming direction, but transmit less power. V smoothing block 308 can ensure the continuity of steering matrices in the frequency domain.

Referring back to FIG. 2, for each sub-carrier, SVD block 202 can decompose the channel response into two orthonormal matrices and one diagonal matrix. An orthonormal matrix is a square matrix in which all vectors (columns and rows) have unit length. A diagonal matrix is a square matrix having values on the diagonal (upper left corner to lower right corner) and zeros at all non-diagonal positions.

Specifically, the channel matrix of each sub-carrier can be decomposed by SVD block 202 as:

$$H_{n \times m} = U_{n \times n} S_{n \times m} V'_{m \times m}$$

where U is an n×n orthonormal unitary matrix, V' (the conjugate transpose of V) is an m×m orthonormal unitary matrix, and S is an n×m diagonal matrix. The diagonal entries $S_{i,j}$ of S are known as singular values of H. The n columns of U and the m columns of V are called left singular vectors and right singular vectors of H, respectively.

By removing the right side orthonormal matrix in steering matrix retrieval block 106, the equivalent channel matrix will become an orthogonal matrix having no interference between streams. Specifically, the equivalent channel with steering matrix can be represented as:

$$H_{eq} = US$$

And the received signal Y can be represented as $$Y = US \cdot X + N = \begin{bmatrix} u_{11} & u_{12} & \cdots & u_{1n} \\ u_{21} & u_{22} & \cdots & u_{2n} \\ \vdots & \vdots & \ddots & \vdots \\ u_{n1} & u_{n2} & \cdots & u_{nn} \end{bmatrix} \begin{bmatrix} s_1 & 0 & \cdots & 0 \\ 0 & s_2 & \cdots & 0 \\ \vdots & \vdots & \ddots & \vdots \\ 0 & 0 & \cdots & s_m \end{bmatrix} \begin{bmatrix} x_1 \\ x_2 \\ \vdots \\ x_m \end{bmatrix} + N$$

wherein x is the transmitted signal and N is noise. Assuming ideal channel equalization at the receiver, the signal can be represented as:

$$SU'Y = S^2 \cdot X + SU'N = \begin{bmatrix} s_1^2 x_1 \\ s_2^2 x_2 \\ \vdots \\ s_m^2 x_m \end{bmatrix} + \hat{N}$$

where $\hat{N}$ is the estimated noise.

Because the singular values are in descending order) ($s_1 \geq s_2 \geq \ldots \geq s_m$), the lowest power on the last stream might dominate the packet error rate in equal modulation. Therefore, the number of stream transmitted is typically less than the number of transmitting antennas in equal modulation. Notably, with equal modulation and maximum streams transmitting, balanced singular values can provide a better overall packet error rate.

To transmit the maximum data streams, thereby ensuring maximum throughput of transmit beamforming, the channel can be pre-equalized at the transmitter. As discussed below, pre-MMSE block 303 can advantageously isolate the streams when the number of transmitting streams equals the number of transmitting antennas, and reduce the interference at the receiver in a MIMO system. Pre-MMSE block 303 can also increase the receiving SNR and improve receiver performance. For the receiver which does not support a maximum likelihood (ML) decoder, pre-MMSE block 303 can provide a better equivalent channel and results in a better performance. According to MMSE, the pre-coding matrix can be expressed as:

$$W = H_{est}^H \cdot (\Sigma^2 \cdot \alpha + H_{est} \cdot H_{est}^H)^{-1}$$

where $\Sigma^2$ is a diagonal matrix which consists of the stream noise powers on a receiver, $\alpha$ is the scaling factor, and $H_{est}$ is the channel estimation provided by the receiver. Ideally, the equivalent channel with the pre-coding matrix becomes an identity matrix for every sub-carrier, and cancels the mutual stream interferences in other streams.

For a high SNR, if the bias term $\Sigma^2 \cdot \alpha$ is ignored in the above MMSE equation, then the receiving (i.e. predicted) SNR depends on the channel response. Therefore, the pre-coding matrix can be expressed as $W = H^{-1}$ ideally.

Assuming the total receiving power with pre-coding matrix is $E_s$, and the power of pre-coding matrix is $P = \text{mean}(|W|^2)$, then the transmitting signal can be represented as:

$$Tx = \sqrt{P^{-1}} W \cdot X$$

and the received signal can be represented by:

$$Rx = \sqrt{E_s P^{-1}} X + n$$

Therefore, the receiving SNR with pre-coding matrix W can be represented by:

$$SNR_{MMSE} = SNR \cdot P^{-1}$$

$$\text{where } SNR = \frac{E_s}{\sigma^2}$$

Note that the bias term of pre-MMSE is not only for the channel estimation error, but is also due to the limitation of total transmitting power. Thus, a proper bias can achieve better receiver performance, even though the SNRs of some streams are sacrificed. Note that because of the constraint of transmitting power, a ML decoder may provide better results than using pre-MMSE. But pre-MMSE transmit beamforming can improve the performance for the receiver without a ML decoder.

Because any channel matrix can be decompressed by SVD, the right side orthonormal matrix and the singular values can be used instead of the channel estimate to reduce the overhead of feedback (i.e. the values stored by steering matrix storage block 105, FIG. 1, which represent feedback from the receiver to the transmitter of transceiver 100). Down link multi-user (DL-MU) application in the IEEE 802.11ac standard provides for feedback with a per tone steering matrix and a per tone SNR, which is identical to a per tone singular value. Adopting this feedback format, the equivalent channel with the pre-coding matrix can be the left side orthonormal matrix of the channel estimated ideally. Because the matrices are orthonormal, the interference between antennas is cancelled in the receiver.

The MMSE equation with DL-MU feedback format can be written as:

$$W = (V \cdot S) \cdot (\Sigma^2 \cdot \alpha + (V \cdot S)^H \cdot (V \cdot S))^{-1}$$

where $H_{est} = USV^H$.

In the IEEE 802.11n/ac standard, for single user transmit beamforming (SU-TxBF), the feedback information only contains the steering matrices and per-stream SNR, which is the averaged SNR across sub-carriers. For SVD transmit beamforming, the pre-coding matrix is the right side orthonormal matrix of the steering matrix V. While applying the right side orthonormal matrix on the transmitter, the receiving SNR of the stream depends on the averaged singular values of SVD decomposition.

After steering matrix retrieval block 106 retrieves the stored matrices from steering matrix storage block 105, the new pre-coding matrix can be calculated according to the steering matrix V and per-stream SNR. The MMSE equation can apply different weighting to the original steering vectors according to the per-stream SNR. Weighting the steering vectors will rearrange the stream power, but advantageously retain the orthogonality of the equivalent channel. Notably, the interferences between streams are still mitigated, and the rearranged power will provide a more balanced SNR on streams for equal modulation. For the receiver which has no ML decoder, this will provide some benefits when the number of transmitting steams is equal to the number of transmit antennas.

The MMSE for single-user transmit beamforming feedback is represented by:

$$W = V \cdot (\Sigma \cdot \alpha + \text{diag}(\sqrt{SNR_{stream}}))^{-1}$$

where $SNR_{stream}$ is the vector of the per-stream SNRs.

Because the limited transmitting power might dominate the performance of pre-MMSE, the bias term in the MMSE equation can be set as the mean of the predicted stream SNR, and the noise floor of the receiver is not necessary. Thus, the MMSE equation can be written as:

$$W = V \cdot \left( \text{diag}\left( \text{mean}\left( \sqrt{SNR_{stream}} \right) + \sqrt{SNR_{stream}} \right) \right)^{-1}$$

Notably, using the mean stream SNR ensures that the equivalent channel has balanced power on most streams. For example, when the number of transmit streams and the number of transmit antennas is equal to 3, then pre-MMSE weighting results in two balanced SNRs and one worse SNR. Overall, the packet error rate (PER) with 3 streams can be improved for the receiver which has no ML detector. The above-described technique, i.e. SVD pre-MMSE, uses the single-user transmit beamforming feedback format of the IEEE 802.11n/ac standard and extends the transmit beamforming rate to a maximum number of streams.

Figure 4:
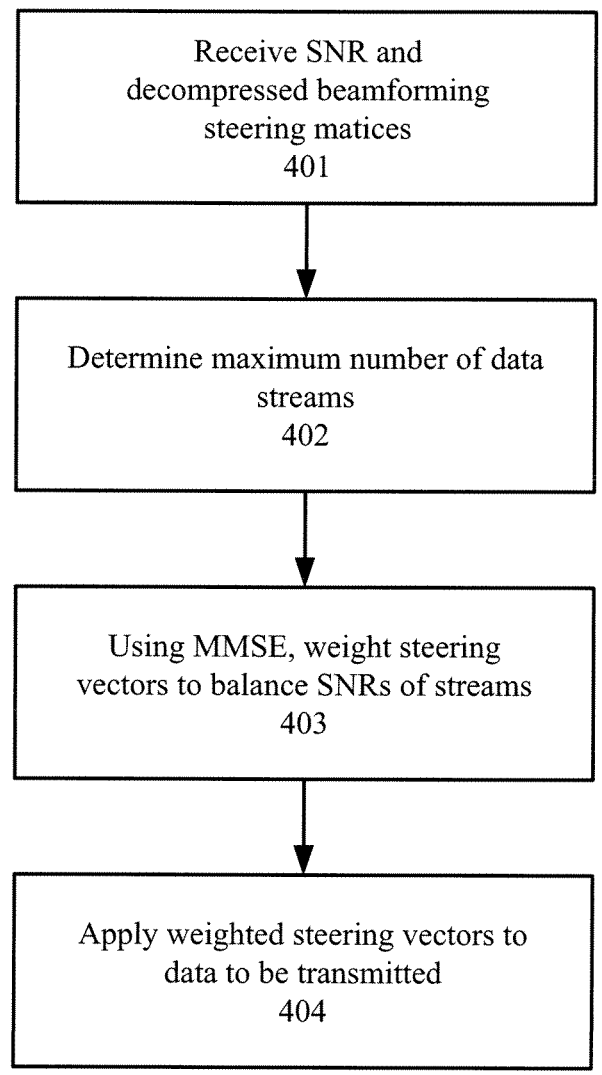
FIG. 4 illustrates an exemplary SVD pre-MMSE technique for a transceiver.

Referring to the above equations for context, FIG. 4 illustrates an exemplary SVD pre-MMSE technique 400 that can be used by transceiver 100 (FIG. 1). Note that an MMSE contains the noise term to calculate the equalizer coefficients for less error. Because the equalizer coefficients and pre-coding matrices are applied at the transmitter in transmit beamforming (TxBF) the term "pre-MMSE" is used. Step 401 can receive the SNR and the decompressed beamforming steering matrices that were stored by steering matrix storage block 105. At this point, the singular values S can be extracted from the diagonal matrix, which forms part of the decompressed beamforming steering matrices. As noted above, the singular values S are in descending order and represent the stream strengths in the MIMO system. Step 402 can determine the maximum number of data streams. Typically, the number of streams is less than the number of transmit antennas, which can then be leveraged. Specifically, step 403 can use MMSE to weight the steering vectors to balance the SNRs of the streams at the expense of one or (at most) a few streams.

Step 404 can apply the weighted steering vectors to data to be transmitted, thereby generating the beamformed data streams for the transceiver.

The above dynamic bandwidth steering means that a 20 MHz packet can be steered with an 80 MHz (or compressed 40 MHz) steering matrix report (i.e. provided by steering matrix storage block 105, FIG. 1). Alternatively, a 40 MHz packet can be steered with an 80 MHz steering matrix report.

Figure 5:
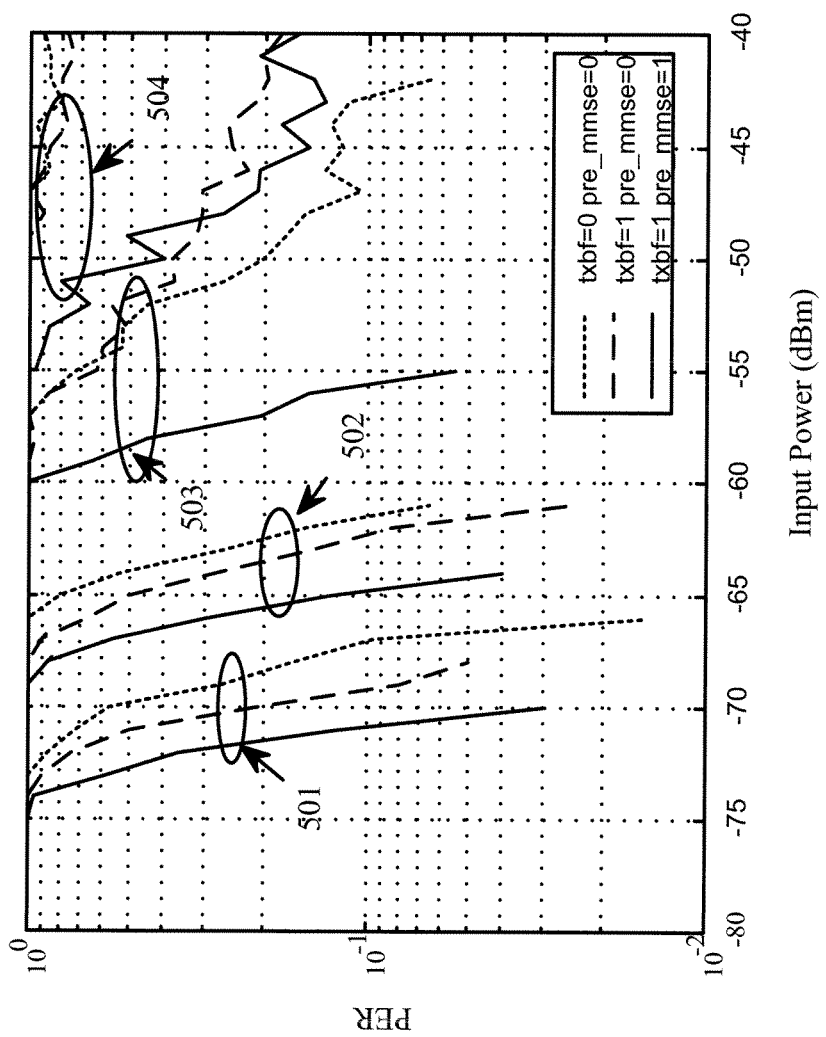
FIG. 5 illustrates simulation results for 3 streams with and without transmit beamforming as well as pre-MMSE.

FIG. 5 illustrates simulation results for 3 streams with and without transmit beamforming (txbf=0 means no transmit beamforming is used, txbf=1 means transmit beamforming is used) as well as SVD pre-MMSE (pre_mmse=0 means no SVD pre-MMSE is used, pre_mmse=1 means SVD pre-MMSE is used). As shown in FIG. 5, irrespective of modulation and coding scheme (MCS) 501, 502, 503, or 504, transmit beamforming using SVD pre-MMSE provides significant performance improvement.

The SVD pre-MMSE transmit beamforming can be implemented in one or more computer programs that execute in a transceiver including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of microcontrollers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

The various embodiments of the invention that are described above are illustrative only of the principles of this invention and are not intended to limit the scope of the invention to the particular embodiments described. Thus, the invention is limited only by the following claims and their equivalents.

The invention claimed is:

1. A method to improve packet error rate in a multiple-input multiple-output (MIMO) communication system, the method comprising:
   decompressing, at a transceiver, a plurality of stored beamforming steering matrices, wherein the plurality of stored beamforming steering matrices are associated with a plurality of sub-carriers of a radio frequency signal received by the transceiver;
   decomposing singular values by singular value decomposition (SVD);
   determining, at a pre-minimum means square error (pre-MMSE) stage, a maximum number of streams used by the MIMO communication system and a predicted signal to noise ratio (SNR) based at least in part on the singular values;
   interpolating the stored beamforming steering matrices to obtain beamforming steering matrices associated with the plurality of sub-carriers;
   using MMSE and the predicted SNR to weight steering vectors of the stored beamforming steering matrices for the streams; and
   applying the weighted steering vectors to data to be transmitted by the transceiver to generate beamformed data streams.

2. The method of claim 1, wherein computing the predicted SNR includes computing averaged singular values.

3. A transceiver in a multiple-input multiple-output communication system, the transceiver comprising:
   a steering matrix retrieval block configured to decompress a plurality of stored beamforming steering matrices, wherein the plurality of stored beamforming steering matrices are associated with a plurality of sub-carriers of a radio frequency signal received by the transceiver, the steering matrix retrieval block comprising:
      a pre-minimum mean square error (pre-MMSE) block configured to determine a maximum number of data streams based on a predicted signal to noise ratio (SNR) and to weight steering vectors of the stored beamforming steering matrices using the predicted SNR and the maximum number of data streams; and
      an interpolating block configured to interpolate the stored beamforming steering matrices to obtain beamforming steering matrices associated with the plurality of sub-carriers;
   a coding block configured to receive data to be transmitted and to split the data into a plurality of data streams corresponding to the plurality of sub-carriers, wherein the maximum number of data streams is equal to or less than the plurality of data streams; a plurality of multipliers, each multiplier receiving inputs from the pre-MMSE block and one of the plurality of data streams; and
   a baseband processing block configured to convert beamformed outputs from the plurality of multipliers from a frequency domain into a time domain and generate a plurality of transmit signals.

4. The transceiver of claim 3, wherein the steering matrix retrieval block further comprises:
   a phase smoothing block configured to provide phase continuity by rotating one or more steering vectors of the stored beamforming steering matrices by a predetermined phase difference.

5. The transceiver of claim 3, wherein the interpolating/ungrouping block includes a smoothing filter configured to reduce effects of noise on the stored beamforming steering matrices.

6. The transceiver of claim 3, wherein the steering matrix retrieval block further comprises:
   a phase offset block configured to compensate for a phase difference caused by cyclic shift definition (CSD) in dynamic bandwidth steering.

7. The transceiver of claim 3, wherein the steering matrix retrieval block further comprises:
   a smoothing block configured to provide continuity of the stored beamforming steering matrices in a frequency domain.

8. The transceiver of claim 3, further including a steering matrix computation block configured to generating the stored beamforming steering matrices, the steering matrix computation block including:

a smoothing block configured to minimizing noise effects on channel estimates and generating smoothed channel estimates;

a singular value decomposition (SVD) block configured to decomposing the smoothed channel estimates to generate steering matrices corresponding to the sub-carriers; and a compressing block configured to compressing the steering matrices, at least some of the compressed steering matrices being the stored beamforming steering matrices.

9. The transceiver of claim 8, wherein the steering matrix computation block further includes a grouping block configured to determining which of the compressed steering matrices are retained as the stored beamforming steering matrices.

10. The transceiver of claim 9, further including a steering matrix storage block configured to storing the stored beamforming steering matrices.

11. A transceiver in a multiple-input multiple-output communication system, the transceiver comprising:
    means for decompressing, at the transceiver, a plurality of stored beamforming steering matrices, wherein the plurality of stored beamforming steering matrices are associated with a plurality of sub-carriers of a radio frequency signal received by the transceiver;
    means for determining, at a pre-minimum mean square error (pre-MMSE) stage, a maximum number of streams used by the MIMO communication system and a predicted signal-to-noise (SNR), the maximum number of streams and the predicted SNR being based at least in part on singular values;
    means for interpolating the stored beamforming steering matrices to obtain beamforming steering matrices associated with the plurality of sub-carriers;
    means for using MMSE and the predicted SNR to weight steering vectors of the plurality of stored beamforming steering matrices for the streams; and
    means for applying the weighted steering vectors to data to be transmitted by the transceiver to generate beamformed data streams.

12. A transceiver in a multiple-input multiple-output communication system, the transceiver comprising:
    means for decompressing a plurality of stored beamforming steering matrices, wherein the plurality of stored beamforming steering matrices are associated with a plurality of sub-carriers of a radio frequency signal received by the transceiver;
    means for determining, at a pre-minimum mean square error (pre-MMSE) stage, a maximum number of streams used by a MIMO communication system and a predicted signal to noise ratio (SNR) based at least in part on singular values;
    means for using MMSE and the predicted signal to noise ratio (SNR) to weight the stored beamforming steering matrices;
    means for interpolating the stored beamforming steering matrices to obtain beamforming steering matrices associated with the plurality of sub-carriers;
    means for splitting data to be transmitted into a plurality of data streams corresponding to the plurality of sub-carriers;
    means for multiplying outputs from the means for using and the means for splitting to generate beam-formed signals; and
    means for converting the beam-formed signals from a frequency domain into a time domain, thereby generating a plurality of transmit signals.

13. A non-transitory, computer-readable medium storing instructions for improving a packet error rate in a multiple-input multiple-output (MIMO) communication system, the instructions, when executed by a processor of a transceiver, perform steps comprising:
    decompressing a plurality of stored beamforming steering matrices, wherein the plurality of stored beamforming steering matrices are associated with a plurality of sub-carriers of a radio frequency signal received by the transceiver;
    decomposing singular values by singular value decomposition(SVD);
    computing a predicted signal to noise ratio (SNR) based on the singular values;
    determining, using a pre-minimum mean square error (pre-MMSE) equation, a maximum number of streams used by the MIMO communication system based at least in part on the singular values;
    using MMSE and the predicted SNR to weight steering vectors of the streams; and
    applying the weighted steering vectors to data to be transmitted by the transceiver to generate beamformed data streams.

14. The non-transitory, computer-readable medium of claim 13, wherein the step of computing the predicted SNR includes averaging the singular values.

15. A method for transmitting data in a multiple-input multiple out (MIMO) communication system, the method comprising:
    determining, at a pre-minimum mean square error (pre-MMSE) stage, a maximum number of data streams based on a predicted signal to noise ratio (SNR);
    applying weight steering vectors of a stored beamforming steering matrices using the predicted SNR and the maximum number of data streams;
    interpolating a plurality of stored beamforming steering matrices to obtain beamforming steering matrices associated with a plurality of sub-carriers;
    receiving data to be transmitted and splitting the data into a plurality of data streams corresponding to the plurality of sub-carriers, wherein the maximum number of data streams is equal to or less than the plurality of data streams;
    receiving inputs from the pre-MMSE block and one of the plurality of data streams at each of a plurality of multipliers;
    converting beam-formed outputs from the plurality of multipliers from a frequency domain into a time domain for transmission over a plurality of transmit signals.

16. The method of claim 15, further comprising:
    rotating one or more steering vectors of the stored beamforming steering matrices by a predetermined phase difference.

17. The method of claim 15, further comprising:
    applying a smoothing filter to reduce effects of noise on the stored beamforming steering matrices.

18. The method of claim 15, further comprising:
    minimizing noise effects on channel estimates and generating smoothed channel estimates;
    decomposing the smoothed channel estimates to generate steering matrices corresponding to the sub-carriers; and
    compressing the steering matrices, at least some of the compressed steering matrices being the stored beamforming steering matrices.

19. A non-transitory, computer-readable medium storing instructions configured to cause at least one processor to:

determine, at a pre-minimum mean square error (pre-MMSE) stage, a maximum number of data streams based on a predicted signal to noise ratio (SNR);

apply weight steering vectors of a stored beamforming steering matrices using the predicted SNR and the maximum number of data streams;

interpolate a plurality of stored beamforming steering matrices to obtain beamforming steering matrices associated with a plurality of sub-carriers;

receive data to be transmitted and splitting the data into a plurality of data streams corresponding to the plurality of sub-carriers, wherein the maximum number of data streams is equal to or less than the plurality of data streams;

receive inputs from the pre-MMSE block and one of the plurality of data streams at each of a plurality of multipliers;

convert beam-formed outputs from the plurality of multipliers from a frequency domain into a time domain for transmission over a plurality of transmit signals.

20. An apparatus for transmitting data in a multiple-input multiple out (MIMO) communication system, the apparatus comprising:

means for determining, at a pre-minimum mean square error (pre-MMSE) stage, a maximum number of data streams based on a predicted signal to noise ratio (SNR);

means for applying weight steering vectors of a stored beamforming steering matrices using the predicted SNR and the maximum number of data streams;

means for interpolating a plurality of stored beamforming steering matrices to obtain beamforming steering matrices associated with a plurality of sub-carriers;

means for receiving data to be transmitted and splitting the data into a plurality of data streams corresponding to the plurality of sub-carriers, wherein the maximum number of data streams is equal to or less than the plurality of data streams;

means for receiving inputs from the pre-MMSE block and one of the plurality of data streams at each of a plurality of multipliers; and means for converting beam-formed outputs from the plurality of multipliers from a frequency domain into a time domain for transmission over a plurality of transmit signals.

* * * * *